United States Patent
Jentz et al.

(10) Patent No.: US 11,053,823 B2
(45) Date of Patent: Jul. 6, 2021

(54) HEAT EXCHANGER FOR EXHAUST TUNING SYSTEM

(71) Applicant: Ford Global Technologies, LLC, Dearborn, MI (US)

(72) Inventors: Robert Roy Jentz, Westland, MI (US); Sanyam Sharma, Dearborn, MI (US); Sumanth Dadam, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/546,103

(22) Filed: Aug. 20, 2019

(65) Prior Publication Data

US 2019/0368397 A1 Dec. 5, 2019

Related U.S. Application Data

(62) Division of application No. 15/792,677, filed on Oct. 24, 2017, now Pat. No. 10,436,087.

(51) Int. Cl.

| | |
|---|---|
| *F01N 1/16* | (2006.01) |
| *F01N 3/02* | (2006.01) |
| *F01N 3/08* | (2006.01) |
| *F01N 3/10* | (2006.01) |
| *F01N 5/02* | (2006.01) |

(Continued)

(52) U.S. Cl.
CPC .......... *F01N 1/165* (2013.01); *F01N 3/0205* (2013.01); *F01N 5/02* (2013.01); *F01N 11/002* (2013.01); *F01N 3/0814* (2013.01); *F01N 3/0842* (2013.01); *F01N 3/101* (2013.01); *F01N 9/00* (2013.01); *F01N 2240/02* (2013.01); *F01N 2240/10* (2013.01); *F01N 2510/02* (2013.01); *F01N 2560/06* (2013.01); *F01N 2560/14* (2013.01); *F01N 2900/0422* (2013.01); *F01N 2900/06* (2013.01); *F01N 2900/08* (2013.01); *F01N 2900/12* (2013.01); *F01N 2900/1631* (2013.01)

(58) Field of Classification Search
CPC . F01N 1/165; F01N 1/18; F01N 11/00; F01N 11/002; F01N 3/0205; F01N 3/0814; F01N 3/0842; F01N 3/101; F01N 5/02; F01N 9/00; F01N 2240/02; F01N 2240/10; F01N 2510/02; F01N 2560/06; F01N 2560/14; F01N 2900/0422; F01N 2900/06; F01N 2900/08; F01N 2900/12; F01N 2900/1631; Y02A 50/20; Y02T 10/12; Y02T 10/40
USPC .......................................................... 60/320
See application file for complete search history.

(56) References Cited

U.S. PATENT DOCUMENTS

| | | |
|---|---|---|
| 6,875,407 B1 | 4/2005 | Biel, Jr. et al. |
| 8,256,212 B2 | 9/2012 | Miretti |

(Continued)

*Primary Examiner* — Audrey K Bradley
*Assistant Examiner* — Dapinder Singh
(74) *Attorney, Agent, or Firm* — Geoffrey Brumbaugh; McCoy Russell LLP

(57) ABSTRACT

Methods and systems are provided for a heat exchanger phase change material installed as a component of a variable exhaust tuning system. In one example, a method may include absorbing excess heat energy from exhaust gases during and after an engine-on event within a heat exchanger material, releasing heat energy stored in the heat exchanger material during and after an engine-off event, and heating an adjustable exhaust valve with the heat energy stored in the heat exchanger material.

17 Claims, 5 Drawing Sheets

(51) Int. Cl.
*F01N 11/00* (2006.01)
*F01N 9/00* (2006.01)

(56) References Cited

U.S. PATENT DOCUMENTS

| | | | |
|---|---|---|---|
| 8,646,261 B2 | 2/2014 | Meisner et al. | |
| 8,800,263 B2* | 8/2014 | Eder | F01N 5/025 60/275 |
| 9,306,143 B2 | 4/2016 | Ranalli et al. | |
| 9,761,781 B2 | 9/2017 | Sui et al. | |
| 2012/0073276 A1* | 3/2012 | Meisner | H01L 35/30 60/320 |
| 2013/0312390 A1 | 11/2013 | Porras et al. | |
| 2013/0312717 A1 | 11/2013 | Martin et al. | |
| 2013/0313031 A1 | 11/2013 | Porras et al. | |
| 2014/0000249 A1* | 1/2014 | Moors | H01L 35/30 60/320 |
| 2014/0208725 A1* | 7/2014 | Schweizer | F01N 13/16 60/320 |

\* cited by examiner

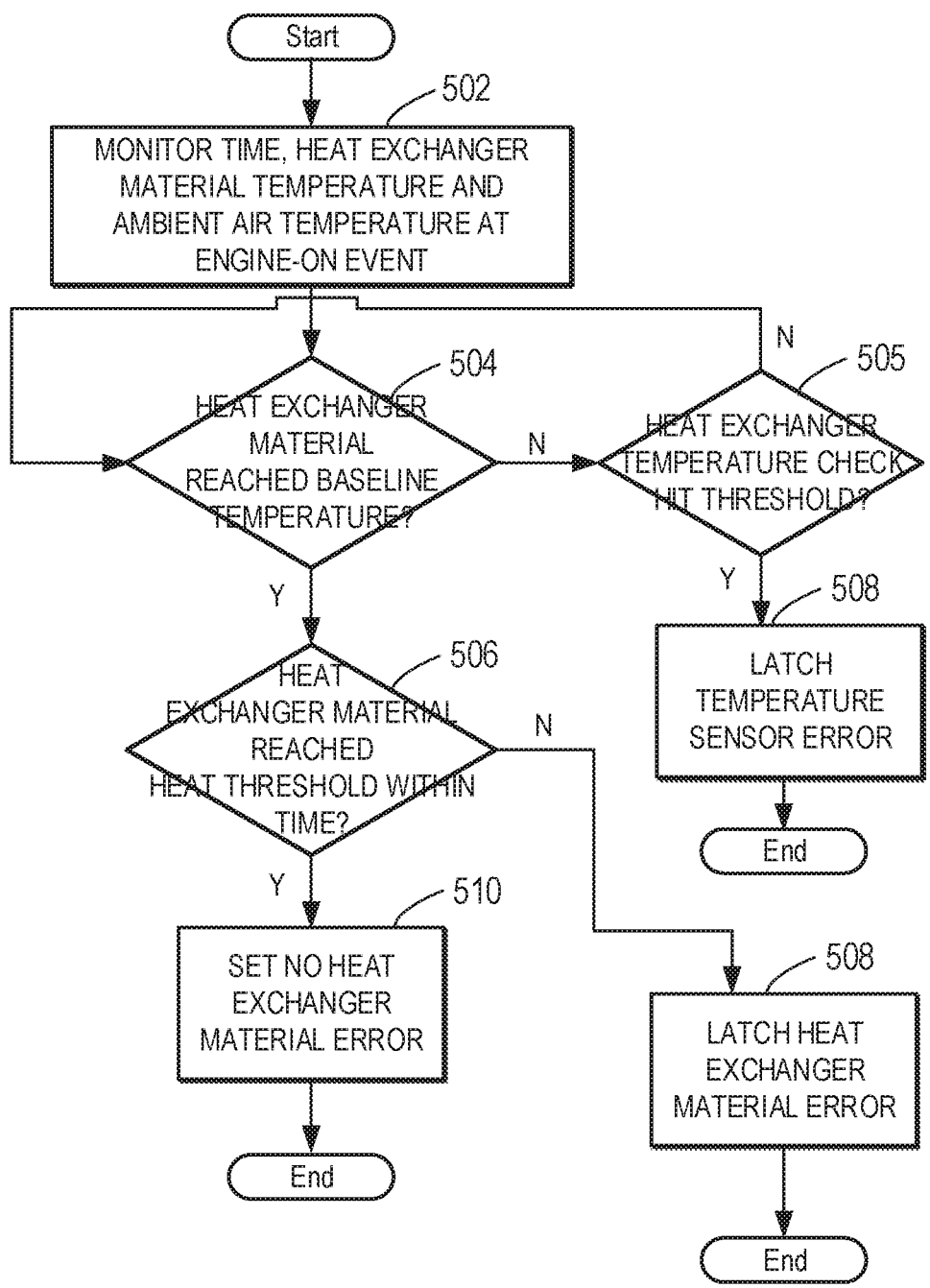

HEAT EXCHANGER FOR EXHAUST TUNING SYSTEM

CROSS REFERENCE TO RELATED APPLICATION

The present application is a divisional of U.S. Non-Provisional patent application Ser. No. 15/792,677, entitled "HEAT EXCHANGER FOR EXHAUST TUNING SYSTEM," and filed on Oct. 24, 2017. The entire contents of the above-referenced application are hereby incorporated by reference for all purposes.

FIELD

The present description relates generally to methods and systems for phase change material (PCM) heat exchangers to prevent adjustable exhaust valves from sticking due to ice formation.

BACKGROUND/SUMMARY

In high-powered internal combustion engines, variable exhaust tuning systems are desired to control the noise output levels of motor vehicles equipped with high-powered engines. Additionally, a vehicle operator's ability to adjust the sound levels, or noise, vibration and harshness (NVH) from a control unit within the vehicle, may lead to an improved driving experience wherein the driver may select their preferred sound levels. As an example, a variable exhaust tuning system may comprise a resonator and one or more mufflers fluidically connected to the resonator. A muffler may include one or more adjustable exhaust valves and the angle of the valve may be adjusted by the vehicle operator. In some examples, further opening the adjustable exhaust valve may decrease back pressure in the muffler and/or resonator and increase the noise level, while in other examples, further closing the valve may increase back pressure in the muffler and/or resonator and decrease the noise level.

An issue that may arise with the abovementioned variable exhaust tuning systems is that one or more adjustable exhaust valves may become stuck open or closed, causing performance issues related to engine performance or NVH. In some cases, adjustable exhaust valves may become stuck due to ice formation. As the valve material heats up during normal operation of the vehicle, a rapid cooldown of the material may cause significant water condensation from exhaust gases and ambient air and eventually ice formation from such water condensation.

If one or more adjustable exhaust valves becomes stuck the quality of the driving experience may significantly decrease and the variable exhaust tuning system may incur damage due to undesirable buildup of exhaust gases or backpressure. Thus, providing a heat exchanger material in order to vaporize the water buildup from condensation may help to eliminate the issue of an adjustable exhaust valve becoming stuck due to ice formation.

Other attempts to implement phase change materials for heat recovery include Meisner et al. in U.S. Pat. No. 8,646,261 B2. Therein, the Meisner et al. patent provides devices intended for placement in the exhaust of a hydrocarbon fueled combustion device which extract heat from the exhaust gases and convert the extracted heat to electricity. Another example approach is shown by Biel Jr. et al. in U.S. Pat. No. 6,875,407 B1. Therein, the Biel Jr. et al. patent provides catalytic converter devices equipped with heat exchanger phase change materials for temperature control functionality.

However, the inventors herein have recognized potential issues with such systems. As one example, during the normal operation of a vehicle many moving parts heat up significantly and then rapidly cooldown due to hot exhaust gases no longer flowing. The heat exchangers used in the above-mentioned disclosures do not address issues related to vehicle functionality after an engine-off event, and in particular, fail to address solutions related to ice formation due to condensing water from ambient air or exhaust gases.

In one example, the issues described above may be addressed by a method for assessing the heat capacity of a heat exchanger of an adjustable engine exhaust valve, comprising: monitoring ambient air temperature, a heat exchanger temperature, and an engine-on time at engine-on event, determining if the heat exchanger temperature has reached a heat threshold within a threshold time, and if the heat threshold has not been reached within the threshold time then latching a heat exchanger error, and alerting a vehicle operator that the heat threshold has not been reached.

In this way, devices and methods for vaporizing water from air and/or exhaust gas condensation prevent ice formation and stuck valves. By incorporating heat exchanger phase change materials into the vehicle assembly, stuck valves due to ice formation may be avoided. Additionally, false stuck valve errors may be avoided which may waste a vehicle operator's time by requiring the vehicle operator to drive the vehicle with the false stuck valve error to a technician to clear the false error.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 5 shows a flowchart representing an exemplary method for assessing the heat capacity of a heat exchanger material.

DETAILED DESCRIPTION

The following description relates to systems and methods for diagnosing a stuck adjustable exhaust valve and delaying and preventing setting an alarm based upon at least one of an ambient and exhaust temperature. Methods include launching self-healing routines, cycling adjustable exhaust valve positioning, and checking sensor and actuator feedback.

Figure 1:
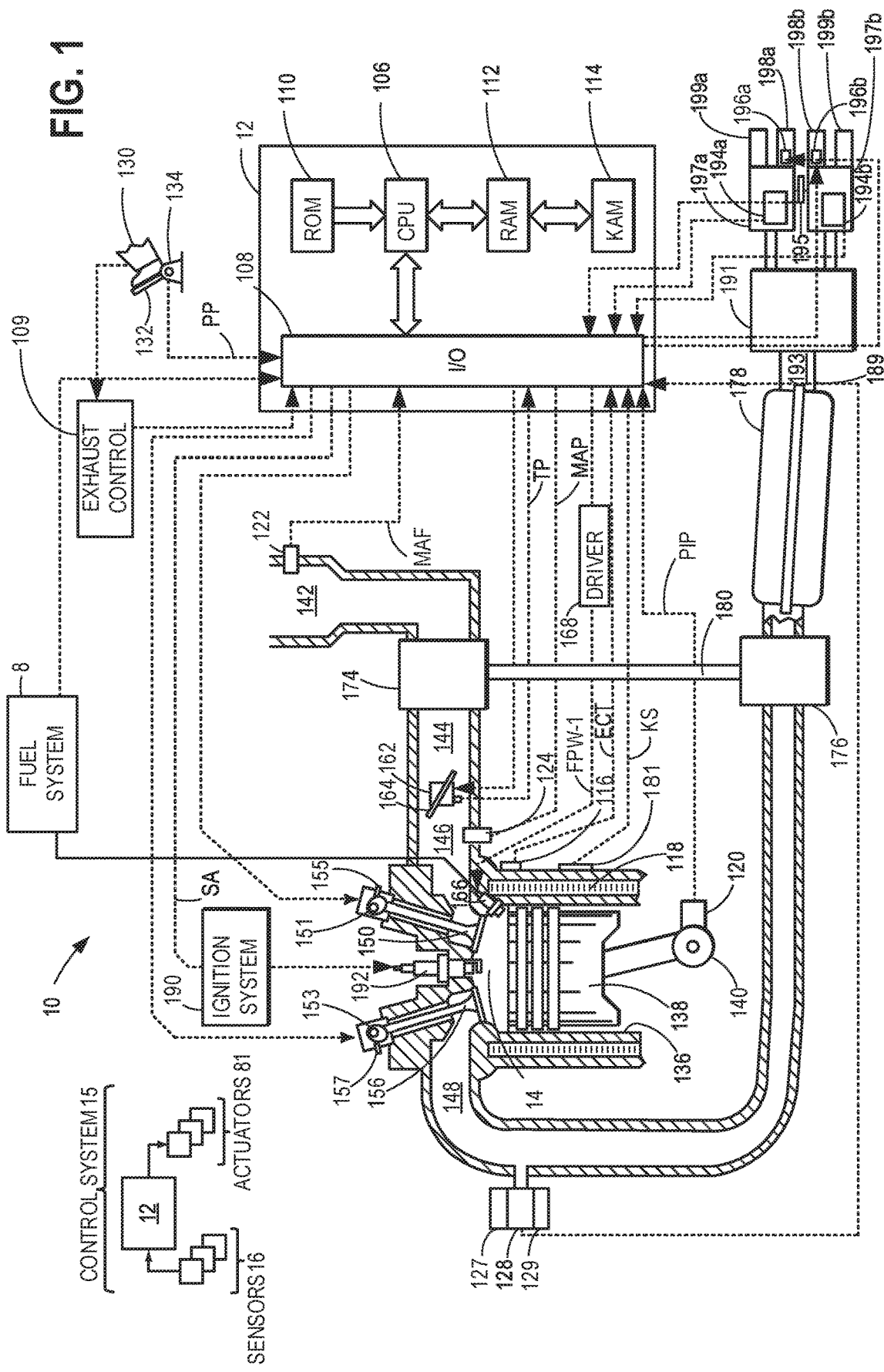
FIG. 1 shows an example internal combustion engine with variable exhaust tuning system.

FIGS. 1, 2A, and 2B may be discussed collectively to provide a clear description. FIG. 1 depicts an example embodiment of a combustion chamber or cylinder of internal combustion engine 10. Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10. Cylinder 14 can receive intake air via a series of intake air passages 142, 144, and 146. Intake air passage 146 may communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be disposed downstream of compressor 174 as shown in FIG. 1, or alternatively may be provided upstream of compressor 174.

Exhaust passage 148 may receive exhaust gases from other cylinders of engine 10 in addition to cylinder 14. Exhaust gas sensor 128 is shown coupled to exhaust temperature sensor 129 and exhaust constituent sensor 127 off exhaust passage 148 upstream of emission control device 178. In an alternate embodiment, these sensors may not be located adjacent to one another and may be dispersed through exhaust passage 148. Exhaust gas sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof. Exhaust gas sensor 128, exhaust temperature sensor 129 and exhaust constituent sensor 127 provide input to controller 12 via input/output ports 108.

Exhaust tuning resonator 191 may receive exhaust gases from emission control device 178 via post-treatment passage 193 having post-treatment walls 189. Resonator 191 may be fluidically coupled to emission control device 178 via post-treatment passage 193. In an example, resonator 191 may also be fluidically coupled via a first post-resonator passage 193a to a first muffler 197a and resonator 191 may also be fluidically coupled via second post-resonator passage 193b to a second muffler 197b. In an example, the first muffler 197a may include a first temperature sensor and/or delta pressure sensor 194a and the second muffler 197b may include a second temperature sensor and/or delta pressure sensor 194b. In an example the first and second temperature sensor and/or delta pressure sensors 194a, 194b may track receive temperature and pressure input of the exhaust gases of the variable exhaust tuning system which my change over time and as a position of one or more adjustable exhaust valves 196a, 196b changes. In another example, the first muffler 197a may be fluidically connected to a first muffler inner exhaust port 198a and a first muffler outer exhaust port 199a. In another example, the second muffler 197b may be fluidically connected to a second muffler inner exhaust port 198b and a second muffler outer exhaust port 199b. In an example, a microphone 195 may be located between the first and second mufflers 197a, 197b and may be attached to first and second mufflers 197a and 197b via supports. In another example, the microphone may be attached to a bottom surface of the vehicle. In an example, the bottom surface of the vehicle may face the road on which the vehicle is travelling and the bottom surface of the vehicle may face away from the cabin of the vehicle.

In a further example, the first muffler inner exhaust port 198a and the second muffler inner exhaust port 198b may, respectively, include a first adjustable exhaust valve 196a and a second adjustable exhaust valve 196b. In an example, the first and second adjustable exhaust vales 196a, 196b may be communicatively coupled to the controller 12 via input/output ports 108. In an example, the first and second adjustable exhaust valves 196a, 196b may be damper valves, butterfly valves, globe valves, ball valves, poppet valves, quarter turn valve, compression valve or other valve controlled by an actuator (the actuator to be discussed in more detail with respect to FIGS. 2A and 2B). In an example, the first temperature sensor and/or delta pressure sensor 194a and the second temperature sensor and/or delta pressure sensor 194b may each be communicatively coupled to controller 12 via input/output ports 108. In an example, the first and second adjustable exhaust valves 196a and 196b may be controlled by an operator of the motor vehicle to adjust a sound experience of the vehicle. In an example, adjusting the first and second adjustable exhaust valves 196a and 196b may adjust the sound level and/or back pressure of the exhaust system of the vehicle.

In an example, the resonator 191, post-resonator passages 193a and 193b, mufflers 197a and 197b, outer exhaust ports 199a and 199b, and inner exhaust ports 198a and 198b may be configured and/or shaped to provide adjustable exhaust tuning, or increased and decreased exhaust sound levels, via adjustment of adjustable exhaust valves 196a, 196b.

In an example, the first and second adjustable exhaust valves 196a and 196b may be adjustable by the vehicle operator 130 via exhaust control 109. Exhaust control 109 may be controllable by the vehicle operator 130 to adjust an angular positioning of the first and second adjustable exhaust valves 196a and 196b. The exhaust control 109 may include one or more exhaust valve settings which may be selectable by the vehicle operator 130. As an example, a vehicle operator 130 selection of an exhaust valve setting may command the first and second adjustable exhaust valves 196a and 196b to the angular positioning associated with the exhaust valve setting of the exhaust control 109. As an example, exhaust control 109 may be communicatively coupled to the controller 12 via input/output ports 108. As an example, exhaust control 109 may command, via vehicle operator 130 selection of the exhaust valve setting, the first and second adjustable exhaust valves 196a and 196b to between and including angular positioning wherein the first and second adjustable exhaust valves 196a and 196b may be either completely open or completely closed.

In another example, resonator 191 may be configured to receive exhaust gases directly from exhaust passage 148 downstream of exhaust turbine 176 and the first and second mufflers 197a, 197b may each an include emission control device 178 within the first and second mufflers 197a, 197b. In such an example post-treatment passage 193 may fluidically couple exhaust turbine 176 to resonator 191.

Exhaust temperature may be measured by one or more temperature sensors such as exhaust temperature sensor 129 located in exhaust passage 148 and temperature sensors contained within the variable exhaust tuning system comprising at least post-treatment passage 193, resonator 191, post-resonator passages 193a and 193b, mufflers 197a and 197b, outer exhaust ports 199a and 199b, and inner exhaust ports 198a and 198b. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize some form of variable valve timing (VVT) such as one or more of cam profile switching (CPS), variable cam timing (VCT), such as twin independent variable cam timing (tiVCT), and/or variable valve lift (VVL) systems that may be operated by controller 12 to vary valve operation. The operation of intake valve 150 and exhaust valve 156 may be determined by valve position sensors (not shown) and/or camshaft position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more injectors for providing fuel. As a non-limiting example, cylinder 14 is shown including one fuel injector 166. Fuel injector 166 is shown coupled directly to cylinder 14 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 14. While FIG. 1 shows injector 166 as a side injector, it may also be located overhead of the piston, such as near the position of spark plug 192. Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, injector 166 may be a port injector 170, indicated as a variation in dotted line, providing fuel into the intake port upstream of cylinder 14.

Fuel may be delivered by the injector to the cylinder during a single cycle of the cylinder. Furthermore, for a single combustion event, multiple injections of the delivered fuel may be performed per cycle. The multiple injections may be performed during the compression stroke, intake stroke, or any appropriate combination thereof.

As described above, FIG. 1 shows one cylinder of a multi-cylinder engine. As such each cylinder may similarly include its own set of intake/exhaust valves, fuel injector(s), spark plug, etc.

Controller 12 is shown in FIG. 1 as a microcomputer, including microprocessor unit 106, input/output ports 108, an electronic storage medium for executable programs and calibration values shown as read only memory 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; manifold absolute pressure signal (MAP) from sensor 124; and knock signal (KS) from knock sensor 181. Knock sensor 181 may alternatively be located on the cylinder head or may be a sensor to detect vibrations from knock in crankshaft 140. Engine speed signal, RPM, may be generated by controller 12 from signal PIP. Manifold pressure signal MAP from a manifold pressure sensor may be used to provide an indication of vacuum, or pressure, in the intake manifold. Still other sensors may include fuel level sensors and fuel composition sensors coupled to the fuel tank(s) of the fuel system.

Storage medium read-only memory 110 can be programmed with computer readable data representing instructions executable by microprocessor unit 106 for performing the methods described below as well as other variants that are anticipated but not specifically listed. Engine 10 may be controlled at least partially by a control system 15 including controller 12. Controller 12 may receive various signals from sensors 16 coupled to engine 10, and send control signals to various actuators 81 coupled to the engine and/or vehicle. The various sensors may include, for example, various temperature, pressure, and air-fuel ratio sensors. The various actuators may include, for example, valves, throttles, and fuel injectors.

As mentioned above, sensors 16 may include any temperature, pressure, positioning, humidity or contacting sensors or any other sensors described herein. In an example, sensors 16 may include one or more microphones. Actuators 81 may include actuators used to control the first and second adjustable exhaust valves 196a, 196b. Controller 12 may be a microcomputer, including a microprocessor unit, input/output ports, an electronic storage medium for executable programs and calibration values. Controller 12 may be programmed with computer readable data representing instructions executable to perform the methods described below as well as other variants that are anticipated but not specifically listed.

For example, adjusting the first and second adjustable exhaust valves 196a, 196b may include adjusting actuators 81 coupled to adjustable exhaust valves 196a, 196b. In an example, to adjust an angle of an adjustable exhaust valve 196a, 196b, or herein described valve 220, actuators 224a, 224b, 222 may open or close the valve by providing torque via a rotational rod connected to valve 220 along the valve rotational axis 214, further described below with respect to FIG. 2B.

FIG. 2A shows an example alternative view of the variable exhaust tuning system. In an example, the variable exhaust tuning system may include sensors 16 such as post-catalyst sensor 202, pre-flap sensors 204a and 204b, pivot sensors 206a and 206b, post-flap sensors 208a and 208b, and valve positioning sensors 210a and 210b, all located within the variable exhaust tuning system. Sensors 202, 204a, 204b, 206a and 206b, and 208a and 208b may, in an example, all be temperature and/or pressure sensors and the exhaust temperature and exhaust back pressure may be measured by one or more sensors. In an example, sensors 202, 204a, 204b, 206a and 206b, and 208a and 208b may be communicatively coupled to controller 12 via input/output ports 108 and the controller may determine a temperature and/or back pressure model for the variable exhaust tuning system based upon the input provided from the plurality of sensors. In an example, the sensors mentioned herein with respect to FIG. 2A may be installed within the post-treatment walls 189, wherein post-treatment walls 189 may form the structure of the different bodies of the variable exhaust tuning system. In an example the post-treatment walls 189 may be formed from any desirable metal such as aluminum or steel or any desirable alloy. In an example, any of the sensors 202, 204a, 204b, 206a and 206b, and 208a and 208b may be included within sensors 16 of the control system.

In an example, first or second inner exhaust ports 198a or 198b may additionally include, respectively, first and second heat exchanger sleeves 219a and 219b. In an example, 219a and 219b may be laid over and around 198a or 198b and in another example, 219a and 219b may entirely replace 198a and 198b. In an example, the inner heat exchanger layer 231 may lie on top of and be contacting the outer post-treatment wall layer 289d. In another example, the entire area of the inner heat exchanger layer 231 may lie on top of and be contacting the outer post-treatment wall layer 289d. In another example, the first and second heat exchanger sleeves 219a and 219b may cover a portion of the total external surface area of the first and second inner exhaust ports 198a and 198b. In an example, the portion of the total external surface area of the first and second inner exhaust ports 198a and 198b which is covered by the first and second heat exchanger sleeves 219a and 219b may be centered on the adjustable exhaust valves 196a, 196b. In an example, the portion of the total external surface area of the first and second inner exhaust ports 198a and 198b which is covered by the first and second heat exchanger sleeves 219a and 219b may be centered upon the operating area of the adjustable exhaust valves 196a, 196b. In a further example, the portion of the total external surface area of the first and second inner exhaust ports 198a and 198b which is covered by the first and second heat exchanger sleeves 219a and 219b may be the operating area of the adjustable exhaust valves 196a, 196b.

In an example, the variable exhaust tuning system may comprise a plurality of actuators 81. In an example, adjustable exhaust valves 196a and 196b may be respectively adjusted by a first valve actuator 224a and a second valve actuator 224b. In an example, the adjustable exhaust valves 196a, 196b may have an exhaust port length, comprising an upstream-downstream length of an operating area of the adjustable exhaust valves 196a, 196b. In an example, the operating area of the adjustable exhaust valves 196a, 196b may include an upstream-downstream length of the space the adjustable exhaust valves 196a, 196b occupy and/or use.

First and second valve actuators 224a, 224b may be communicatively coupled to controller 12. In an example, control system may include controller 12 which may receive signals from the sensors 16 and employ actuators 81 to adjust engine operation and/or variable exhaust tuning system operation based on the received signals and instructions stored on a memory of the controller further described herein.

FIG. 2B shows a cross-section 237 of an inner exhaust port 198a or 198b equipped with a heat exchanger sleeve 219a or 219b. The cross-section 237 shows an upstream-looking point of view from the downstream end of either a first or second muffler inner exhaust port 198a or 198b, and in such an example, either adjustable exhaust valves 196a or 196b may comprise a butterfly, damper, quarter turn, or compression valve represented by valve 220. In some cases, the positioning of adjustable exhaust valves 196a, 196b may be adjusted by adjustable exhaust valve actuators 224a, 224b which may be represented in FIG. 2B by actuator 222. Actuator 222 may, in an example, adjust the position or rotation angle of valve 220 along a valve rotational axis 214, wherein the rotational axis includes a rotational rod in order to provide turning of the valve 220 via actuator 222. In an example, the rotational rod of valve rotational axis 214 may be attached to and passing through valve 220 or it may be built into valve 220 as a single body. Actuator 222 may optionally or additionally include a valve stuck sensor 226. In a further example, post-treatment walls 189 may further comprise an inner post-treatment layer 289a, a post-treatment wall material 289b having a post-treatment wall thickness 289c, and an outer post-treatment wall layer 289d.

In an example, first or second inner exhaust ports 198a or 198b may additionally include the heat exchanger sleeve 219 (representing either first or second heat exchanger sleeves 219a and 219b of FIG. 2A) comprising an inner heat exchanger layer 231, heat exchanger material 232 and an outer heat exchanger layer 233. In an example, though they are shown to be the same element in FIG. 2B, the inner heat exchanger layer 231 may be contacting the outer post-treatment wall layer 289d and the two layers 231 and 289d may be layered on top of one another. In another example, the post-treatment walls 189 may not be present in the formation of the first or second inner exhaust ports 198a or 198b, and the heat exchanger sleeve 219a or 219b may comprise the assembly of 198a and/or 198b. In an example, the heat exchanger material 232 may be located between the inner heat exchanger layer 231 and the outer heat exchanger layer 233 and have a heat exchanger material thickness 232a, described further with respect to FIG. 2C.

In an example, the heat exchanger material 232 may comprise any appropriate phase change material. In an example, the heat exchanger material 232 may comprise any or any combination of a wax (for example, paraffin wax), salt hydrates, or any other phase change material. In an example the heat exchanger material 232 may comprise any combination of Zn, Mg, Al, and Si. In an example the heat exchanger material 232 may comprise a lithium nitrate material. In an example, the heat exchanger material 232 may be configured to absorb thermal energy and store thermal energy during a phase transition. In an example, the heat exchanger material 232 may absorb thermal energy and store thermal energy during a solid to liquid phase transition. In an example, the heat exchanger material 232 may absorb thermal energy and store thermal energy during a liquid to solid phase transition.

In another example, FIG. 2B includes one or more valve positioning sensors 212 which may be positioned along the valve rotational axis 214 of the valve and they may also be attached to the rotational rod running along valve rotational axis 214. In an example, valve positioning sensors 212 may provide continuous indication of valve 220 position. In addition, valve positioning sensors 212 may be communicatively coupled to controller 12 via input/output ports 108. In an example, valve positioning sensor 212 may be included within actuator 222.

FIG. 2C shows a cross-sectional view of first or second inner exhaust ports 198a or 198b represented by an inner exhaust port 230. In an example, 230 may include one or more phase change material sensors 234. In an example the one or more phase change material sensors 234 may be temperature sensors. In an example, the one or more phase change material sensors 234 may be included within a body of the heat exchanger or included within the heat exchanger material 232. In an example, the heat exchanger material 232 may have a heat exchanger material thickness 232a which may be adjusted to provide more or less heat capacity, wherein a thicker heat exchanger material thickness 232a would provide additional heat capacity and a less thick heat exchanger material thickness 232a would provide less heat capacity. In an example, the one or more phase change material sensors 234 may be communicatively coupled to controller 12 via input/output ports 108 and may provide heat capacity information about heat being absorbed by, stored by, or released by the heat exchanger material 232.

In a further example, 230 may include an outer heat flux sensor 235a and an inner heat flux sensor 235b. In an example, the outer and inner heat flux sensors 235a and 235b may be communicatively coupled to the controller 12 via input/output ports 108. In an example, and further described with respect to FIGS. 3 and 4, flux sensors 235a and 235b may measure, respectively, temperature flux at the outer heat exchanger layer 233 and the inner heat exchanger layer 231. In such an example, heat flux sensors 235a and 235b may send temperature and/or heat flux data via input/output ports 108 to the controller 12 regarding the heat capacity of the heat exchanger material 232, and the heat flux sensors 235a and 235b may also be temperature sensors. In an example, heat flux sensors 235a and 235b may provide heat capacity information about heat being absorbed by, stored by, or released by the heat exchanger material 232. In such an example, the controller 12 may include heat capacity thresholds, further explained with references to FIGS. 4 and 5, which may help to diagnose the quality of the heat exchanger material 232 over time and/or trigger an alarm and/or notification viewable to a vehicle operator 130 to replace the heat exchanger material 232 or to service the first or second inner exhaust ports 198a or 198b and/or to service the first and second heat exchanger sleeves 219a and 219b.

In a further example, the first and second heat exchanger sleeves 219a, 219b may be tubes placed over 198a and 198b. In an example, 219a and 219b may have edge thickness equivalent to the sum of the thickness of 232a and the thicknesses of inner and outer heat exchanger layers 231 and 233. In an example, inner and outer heat exchanger layers 231 and 233 may be sealed at both ends by an upstream seal 237a and a downstream seal 237b ends. In a further example, the first and second heat exchanger sleeves 219a and 219b may optionally or additionally include a refilling port 239 which may be a sealable refilling port used to replace, refill, or recharge the heat exchanger material 232.

Figure 2:
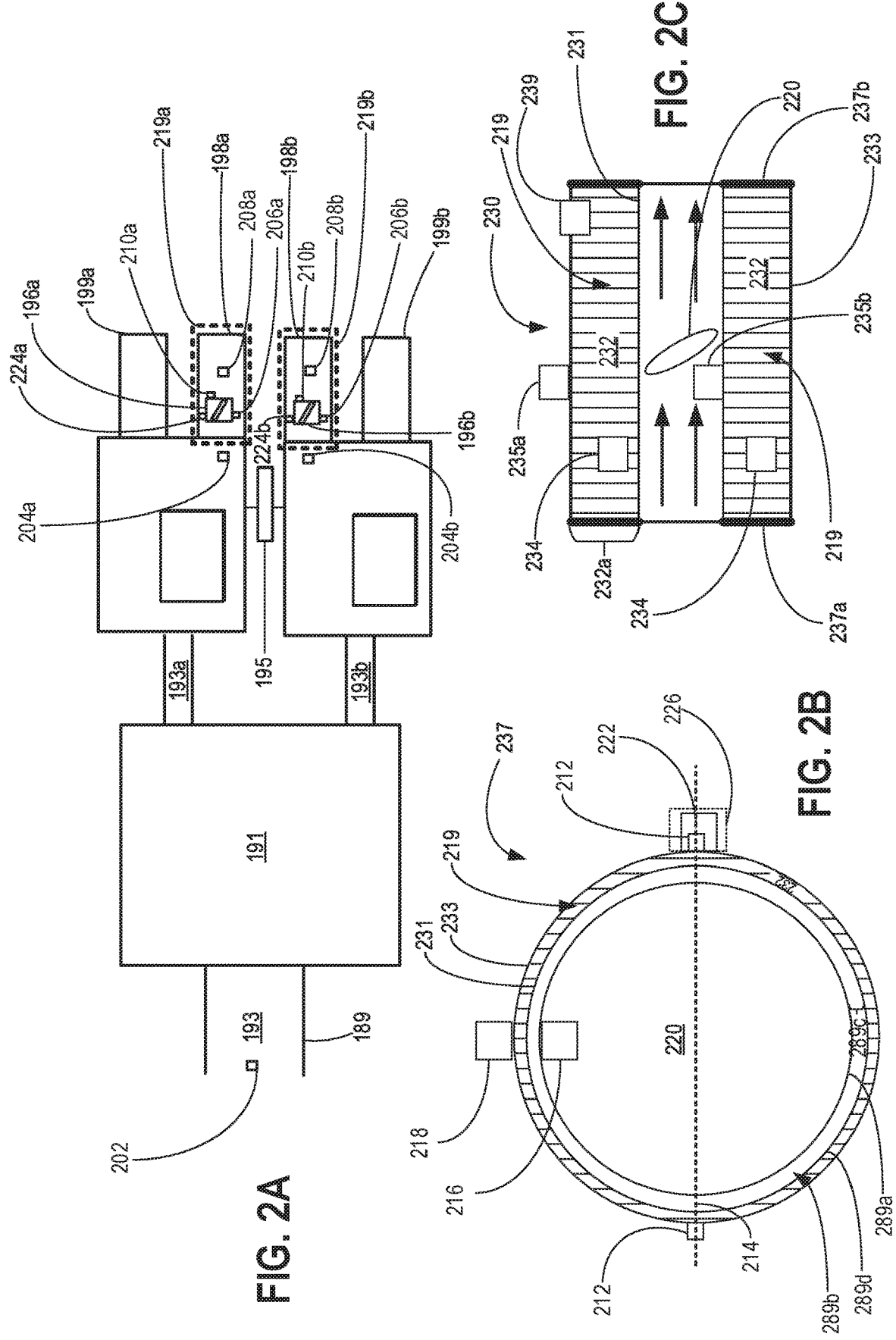
FIG. 2A shows an alternative, enlarged view of an example variable exhaust tuning system.
FIG. 2B shows an upstream-looking point of view from the downstream end of either a first or second muffler inner exhaust port.
FIG. 2C shows a cross-section of an inner exhaust port equipped with an adjustable exhaust valve.
Figure 3:
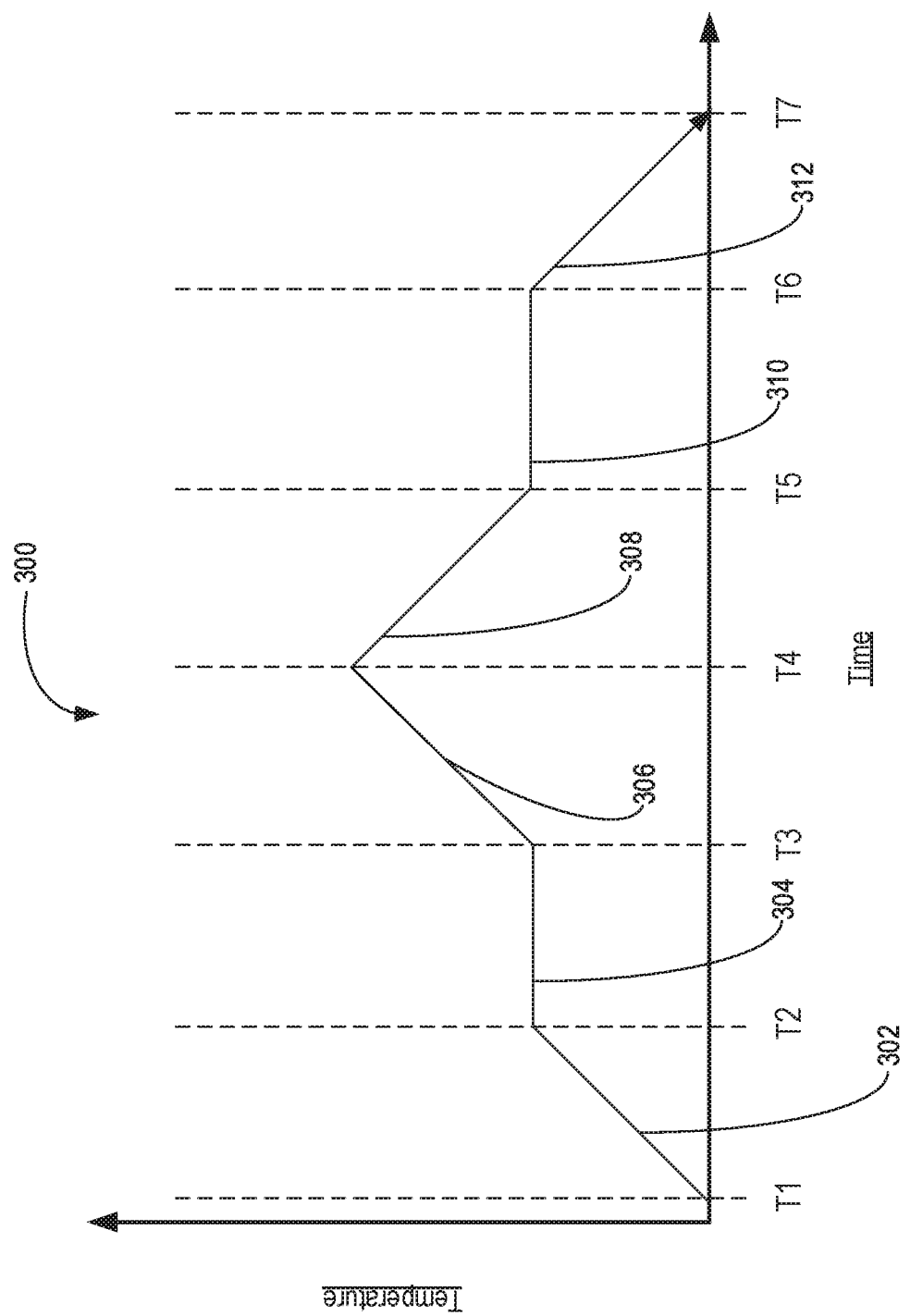
FIG. 3 shows a graph of a heat exchanger material absorbing and releasing heat over time.

Turning now to FIG. 3, a phase change diagram 300 representing the heat exchanger material 232 changing over time during an engine-on period is shown. In an example, at T1 the engine 10 of the vehicle including the variable exhaust tuning system may be turned on. During the engine-on period the exhaust gas of engine 10 may pass through the one or more adjustable exhaust valves 196a, 196b. As the engine 10 runs after T1 during a first time 302 (from T1 to T2) the heat exchanger material 232 described with respect to FIGS. 1-2C may be in a first physical state. During the first time 302, the heat exchanger material 232 in the first physical state may experience an increase in temperature due to the heat exchanger material 232 absorbing heat from exhaust passing through the variable exhaust tuning system.

At T2 of 300 the heat exchanger material 232 may begin to change from the first physical state to a second physical state during time 304. In an example, during time 304 (from T2 to T3) the temperature of the heat exchanger material 232 may remain constant while 232 continues to absorb heat energy from the exhaust gas. Next, at T3 of 300, the heat exchanger material 232 may be fully converted to the second physical state and the temperature of the heat exchanger material 232 may rise during time 306 (T3 to T4) while the heat exchanger material 232 continues to absorb heat energy from the exhaust gas of engine 10.

At T4 of 300, the engine 10 may experience an engine-off event. In an example, during the engine-off event, the engine 10 may be turned off and the exhaust gas of engine 10 may no longer pass through the one or more adjustable exhaust valves 196a, 196b. During time 308 (T4 to T5) the temperature of the heat exchanger material 232 may drop as the heat exchanger material 232 releases heat which may be used to evaporate condensing water which may form on the one or more adjustable exhaust valves 196a, 196b when the engine 10 is turned off. In an example, when the engine 10 is turned off and an ambient temperature is sufficiently cold, water from exhaust gas and/or ambient air may condense upon surfaces of the adjustable exhaust valves 196a, 196b or upon any of the surfaces of the variable exhaust tuning system. Next, at T5 of 300, the heat exchanger material 232 may continue to release heat during time 310 (T5 to T6) while the heat exchanger material returns to the first physical state. Next, at T6 of 300, the heat exchanger material 232 may completely change back from the second physical state to the first physical state and continue to release heat during time 312 (T6 to T7). At T7 of 300, the heat exchanger material 232 may no longer release heat and may be at equilibrium with ambient temperature.

Figure 4:
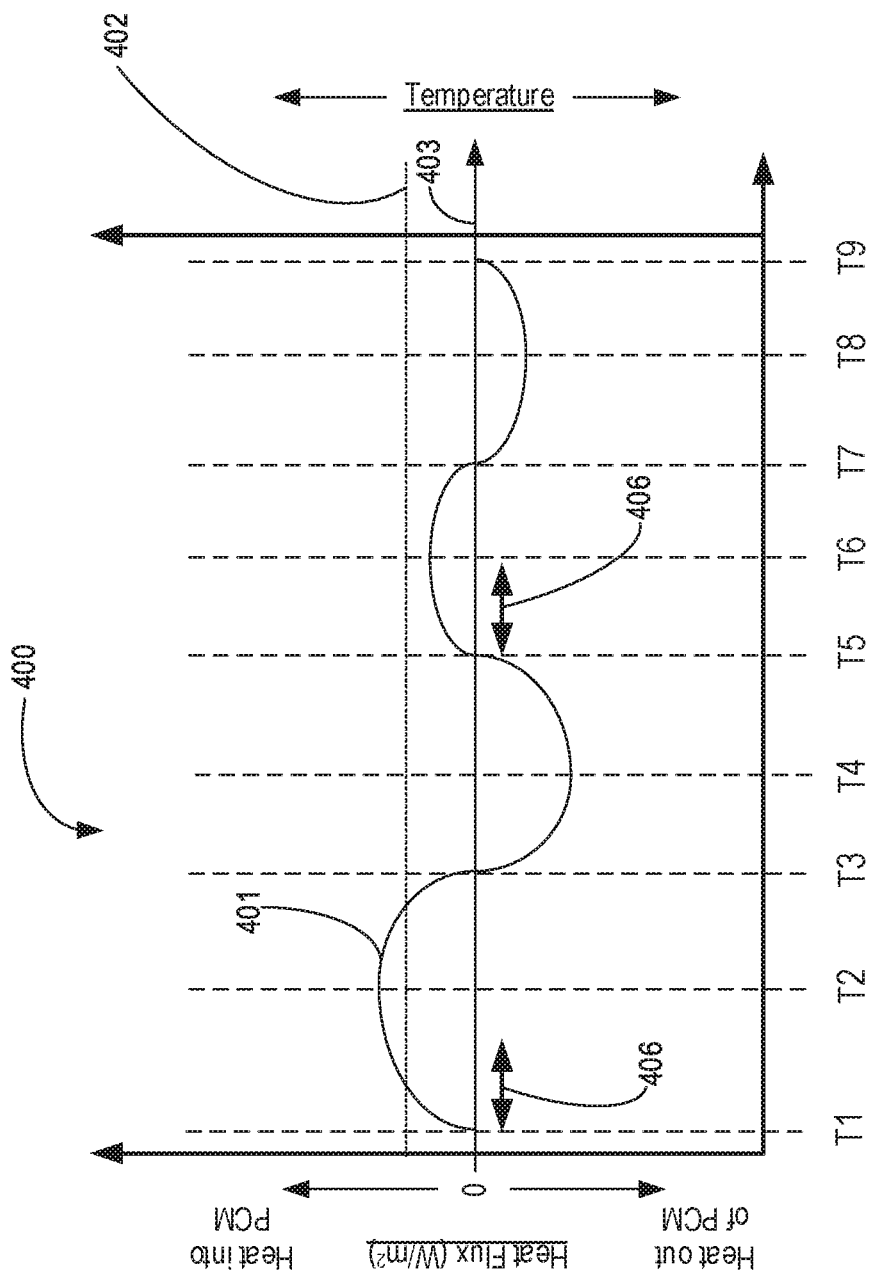
FIG. 4 shows a graph of heat flux into and out of a heat exchanger material over time.

Turning now to FIG. 4, a heat flux graph 400 showing heat flux into and out of the heat exchanger material 232 over time. At T1, the engine 10 may experience an engine-on event wherein the engine 10 may be turned on and exhaust gas may begin to pass through the one or more adjustable exhaust valves 196a, 196b. In an example, the temperature or heat of the heat exchanger material 232 may be represented by line 401 beginning at baseline temperature 403. In an example, the graph 400 may include a heat threshold 402. In such an example, the controller 12 may monitor the heat capacity of the heat exchanger material 232 over a heat capacity threshold time 406 to check if the heat exchanger material 232 needs to be replaced or the post-treatment walls 189 have fouled and are significantly impacting heat flux into and out of the heat exchanger material 232. In an example, the heat capacity threshold time 406 may begin at an engine-on time and may end at a pre-programmed time and the pre-programmed time may be adjusted based upon the ambient air temperature. In another example, the heat capacity threshold time 406 may begin when 401 reaches the baseline temperature 403. In an example, the controller 12, via input/output ports 108, may receive data from one or more heat flux sensors 235a, 235b beginning at engine-on event and determine if the heat exchanger material 232 reaches the heat threshold 402 within the heat capacity threshold time 406. In an example, if the heat exchanger material 232 does not reach the heat threshold 402 within the heat capacity threshold time 406, then the controller 12 may deliver an audio and/or visual alarm to the vehicle operator 130 and may latch an error code indicating a heat capacity error associated with heat exchanger material 232. In a further example, the heat capacity threshold time 406 may be adjusted by a heat capacity threshold time adjuster which may shorten or lengthen the heat capacity threshold time 406 based upon an ambient air temperature. In an example, it may take longer for the heat exchanger material 232 to heat to the heat threshold 402 when an ambient air temperature is very low. In an example, from T1 to T2 of the heat or temperature of the heat exchanger material 232 may pass above the heat threshold 402 before time (represented by x-axis) has reached the heat capacity threshold time.

Next, at T2, the engine 10 may experience an engine-off event and the heat exchanger material 232 may begin to release heat. At T3, the heat exchanger material 232 may return to the baseline temperature 403, however, as time has elapsed, an ambient temperature may have lowered and the heat exchanger material may continue to release heat until T4. At T4, the engine 10 may experience a second engine-on event and the heat exchanger material 232 may begin to absorb heat from exhaust passing through the one or more adjustable exhaust valves 196a, 196b. In an example, once the heat exchanger material 232 reaches the baseline temperature 403 then controller 12 may determine if the heat exchanger material 232 reaches the heat threshold 402 within the heat capacity threshold time 406. In an example, between T5 and T6, the heat exchanger material 232 may not reach the heat threshold 402 within the heat capacity time 406. In such an example, the controller 12 may deliver an audio and/or visual alarm to the vehicle operator 130 and may latch an error code indicating a heat capacity error associated with heat exchanger material 232.

Turning next to FIG. 5, a flowchart for a method 500 of checking the heat capacity of the heat exchanger material 232 or the first and second heat exchanger sleeves 219a, 219b. Method 500 may begin at 502 with an engine-on event wherein the controller 12 may monitor the engine-on time, begin to monitor the temperature of the heat exchanger material 232 and an ambient air temperature. The controller 12 may monitor the ambient air temperature and the temperature of the heat exchanger material 232 via any of the sensors 202, 204a, 204b, 235a, 235b, 234, 206a and 206b, and 208a and 208b. The method 500 may then proceed to 504 wherein the controller may monitor to see if the heat exchanger material 232 has reached the baseline temperature 403. In an example, the controller may receive temperature information regarding the temperature of the heat exchanger material 232 via heat flux sensors 235a and 235b or the one or more phase change material sensors 234. In an example, if the heat exchanger material 232 has not reached the baseline temperature 403, then the method 500 may add a heat exchanger temperature check counter and proceed to 505 wherein the controller 12 may determine if the method 500 has reached a pre-programmed heat exchanger temperature check counter threshold. If the method 500 has not reached the pre-programmed heat exchanger temperature check counter threshold then the method 500 may return to 504 until the heat exchanger material 232 reaches the baseline temperature 403 or until the method 500 reaches the pre-programmed heat exchanger temperature check counter threshold. In an example, if the method 500 reaches the pre-programmed heat exchanger temperature check counter threshold then the method 500 may proceed to 508 and latch a temperature sensor error and the method 500 may end. In a further example, if the controller 12 determines that the heat exchanger material reaches the baseline temperature 403, then the method 500 may proceed to 506. In a further example, the method 500 may set the baseline temperature 403 as the ambient air temperature at the engine-on event or not set the baseline temperature 403 at all. In one example, the method 500 may proceed directly from 502 to 506.

Continuing with the method 500 at 506, the controller 12 may check to see if the heat exchanger material has reached the heat threshold 402 within the heat capacity threshold time 406. As mentioned above, the heat capacity threshold time 406 may be adjusted based upon an ambient air temperature detected at an engine-on event. In one example, where the heat exchanger material 232 has failed to reach the heat threshold 402 within the heat capacity threshold time 406, the method 500 may proceed to 508 and latch a heat exchanger material error and then the method 500 may end. In an example, the heat exchanger material error may be an audio and/or visual alarm delivered to the vehicle operator 130. In a second example, where the heat exchanger material 232 has reached the heat threshold 402 within the heat capacity threshold time 406, the method 500 may proceed to 510 and the controller may set no heat exchanger material error and then the method 500 may end.

Instructions for carrying out method 500 and the rest of the methods included herein may be executed by a controller based on instructions stored on a memory of the controller and in conjunction with signals received from sensors of the engine system, such as the sensors described above with reference to FIGS. 1-2C. The controller may employ engine actuators of the engine system to adjust engine operation, according to the methods described below.

FIGS. 1-2C show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

In one example, a method for assessing the heat capacity of a heat exchanger of an adjustable engine exhaust valve is provided, comprising: monitoring ambient air temperature, a heat exchanger temperature, and an engine-on time at engine-on event, determining if the heat exchanger temperature has reached a heat threshold within a threshold time, and if the heat threshold has not been reached within the threshold time then latching a heat exchanger error, and alerting a vehicle operator that the heat threshold has not been reached. In any or all of the preceding examples, the method may further comprise monitoring the heat exchanger temperature via at least one temperature sensor. In any or all of the preceding examples, the method may optionally or additionally include the threshold time may be adjusted based upon the ambient air temperature. In any or all of the preceding examples, the method may optionally or additionally include the threshold time begins with the engine-on time and ends at a programmable time. In any or all of the preceding examples, the method may further comprise the heat exchanger error being sent to a vehicle operator as an audio and/or visual alarm.

In a further example, a device for preventing ice formation on a post-catalyst variable exhaust tuning system is provided, comprising: an inner heat exchanger layer, an outer heat exchanger layer, a heat exchanger material between the inner and outer heat exchanger layers, at least one temperature sensor, and an adjustable exhaust valve. In any or all of the preceding examples, the device may optionally or additionally include the heat exchanger material is encased by the inner and outer heat exchanger layers. In any or all of the preceding examples, the device may optionally or additionally include the heat exchanger material comprises a wax, a salt, or a salt hydrate. In any or all of the preceding examples, the device may be further configured wherein the inner and outer heat exchanger layers are sealed by an upstream seal and a downstream seal, thereby containing the heat exchanger material and forming a heat exchanger sleeve. In any or all of the preceding examples, the device may further comprise a refill port for exchanging the heat exchanger material. In any or all of the preceding examples, the device may optionally or additionally include a first temperature sensor may be attached to an inner heat exchanger layer. In any or all of the preceding examples, the device may optionally or additionally include a second temperature sensor may be attached to an outer heat exchanger layer. In any or all of the preceding examples, the adjustable exhaust valve may further comprise at least an actuator and a rotational rod. In any or all of the preceding examples, the device may be optionally or additionally include the heat exchanger material may absorb thermal energy and store thermal energy during a solid to liquid phase transition or absorb thermal energy and store thermal energy during a liquid to solid phase transition.

In another example, a device for preventing ice formation on a post-catalyst variable exhaust tuning system is provided, comprising: a heat exchanger sleeve covering at least a portion of an external surface area of an exhaust port, an adjustable exhaust valve included within the exhaust port, and at least one temperature sensor communicatively coupled to a controller. In any or all of the preceding examples, the device may further comprise the portion of the exhaust port covered by the heat exchanger sleeve being an operating area of the adjustable exhaust valve. In any or all of the preceding examples, the heat exchanger sleeve may further comprise a heat exchanger material made of any of a wax, a salt, or a salt hydrate. In any or all of the preceding examples, the adjustable exhaust valve may optionally or additionally include at least a rotational rod, an actuator powering the rotational rod, and a valve. In any or all of the preceding examples, the device may optionally or additionally include the valve is a butterfly valve. In any or all of the preceding claims, the heat exchanger sleeve may further comprise a heat exchanger material which may absorb thermal energy and store thermal energy during a solid to liquid phase transition or absorb thermal energy and store thermal energy during a liquid to solid phase transition.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A device for preventing ice formation on a post-catalyst variable exhaust tuning system, comprising:
    an adjustable exhaust valve positioned in an exhaust port,
    an inner heat exchanger layer positioned around an outer wall layer of a wall of the exhaust port surrounding the adjustable exhaust valve,
    an outer heat exchanger layer,
    a heat exchanger material between the inner and outer heat exchanger layers, and
    at least one temperature sensor.

2. The device of claim 1, wherein the heat exchanger material is encased by the inner and outer heat exchanger layers.

3. The device of claim 1, wherein the heat exchanger material comprises a wax, a salt, or a salt hydrate.

4. The device of claim 1, wherein the inner and outer heat exchanger layers are sealed by an upstream seal and a downstream seal, thereby containing the heat exchanger material and forming a heat exchanger sleeve surrounding the outer wall layer of the wall of the exhaust port.

5. The device of claim 4, further comprising a refill port for exchanging the heat exchanger material.

6. The device of claim 1, wherein the at least one temperature sensor comprises a first temperature sensor attached to the inner heat exchanger layer.

7. The device of claim 1, wherein the at least one temperature sensor comprises a second temperature sensor attached to the outer heat exchanger layer.

8. The device of claim 1, wherein the adjustable exhaust valve comprises at least an actuator and a rotational rod.

9. The device of claim 1, wherein the heat exchanger material absorbs thermal energy and stores thermal energy during a solid to liquid phase transition and releases thermal energy during a liquid to solid phase transition.

10. The device of claim 1, wherein the heat exchanger material absorbs thermal energy and stores thermal energy during a liquid to solid phase transition and releases thermal energy during a solid to liquid phase transition.

11. The device of claim 1, wherein the adjustable exhaust valve is positioned in the exhaust port downstream of a muffler.

12. A device for preventing ice formation on a post-catalyst variable exhaust tuning system, comprising:
    a heat exchanger sleeve covering at least a portion of an external surface area of a region of an exhaust port,
    an adjustable exhaust valve included within the region of the exhaust port, and
    at least one temperature sensor communicatively coupled to a controller.

13. The device of claim 12, further comprising the portion of the external surface area of the exhaust port covered by the heat exchanger sleeve being an operating area of the adjustable exhaust valve.

14. The device of claim 12, wherein the heat exchanger sleeve comprises a heat exchanger material made of any of a wax, a salt, or a salt hydrate.

15. The device of claim 12, wherein the adjustable exhaust valve includes at least a rotational rod, an actuator powering the rotational rod, and a valve.

16. The device of claim 15, wherein the valve is a butterfly valve.

17. The device of claim 12, wherein the heat exchanger sleeve comprises a heat exchanger material which absorbs thermal energy and stores thermal energy during a solid to liquid phase transition or absorbs thermal energy and stores thermal energy during a liquid to solid phase transition.

* * * * *